United States Patent [19]
Krizik

[11] Patent Number: 4,572,607
[45] Date of Patent: Feb. 25, 1986

[54] DISPLACEMENT TRANSDUCER USING A MOVABLE LIGHT SHIELD MOVED WITHIN A PREDETERMINED RANGE FOR LINEAR DETECTOR OUTPUT

[75] Inventor: Jan G. Krizik, Wellesley, Mass.

[73] Assignee: IDR Enterprises, Inc., Wellesley, Mass.

[21] Appl. No.: 604,209

[22] Filed: Apr. 19, 1984

Related U.S. Application Data

[63] Continuation of Ser. No. 345,395, Feb. 3, 1982, abandoned, which is a continuation of Ser. No. 59,259, Jul. 20, 1979, abandoned.

[51] Int. Cl.⁴ ............................ G01B 11/16; H01J 5/02
[52] U.S. Cl. ........................................ 356/32; 250/239; 356/373
[58] Field of Search ................ 356/32, 371, 373, 381; 250/214 C, 229, 231 R, 231 P, 239, 203 R; 73/431, 651, 653, 655, 800; 307/311

[56] References Cited
U.S. PATENT DOCUMENTS
2,877,284  3/1959  Schultz ........................ 250/203 R
3,308,303  3/1967  Weichselbaum et al. ...... 250/231 R FOREIGN PATENT DOCUMENTS
422975  9/1974  U.S.S.R. ............................. 73/653

OTHER PUBLICATIONS
Sisam, C. H. "Analytic Geometry", Henry Holt and Co., 1936, 1949, pp. 155-159, 210-215.
General Electric, "Solid State Optoelectronics", Specification Sheets for Photon Coupled Interrupter Module HBA1 and HBA2.

Primary Examiner—William H. Punter

[57] ABSTRACT

A transducer including a phototransistor arranged to receive light emitted from a light emitting diode and a movable shield between the transistor and diode. The shield is moved relative to the transistor and diode, within a predetermined range, and there is a linear relationship between the displacement of the shield and changes in the output of the phototransistor. The shield is connected to a member whose displacement is to be measured, and displacement of the member is measured simply by measuring the voltage output of the phototransistor.

9 Claims, 4 Drawing Figures

DISPLACEMENT TRANSDUCER USING A MOVABLE LIGHT SHIELD MOVED WITHIN A PREDETERMINED RANGE FOR LINEAR DETECTOR OUTPUT

This is a continuation of application Ser. No. 345,395, filed Feb. 3, 1982, now abandoned, which is a continuation of Ser. No. 59,259, filed July 20, 1979 for TRANSDUCER, and now abandoned.

This invention relates to transducers for measuring displacement.

It is a principal object to the present invention to provide an accurate displacement transducer having a measurable voltage output many times that provided by conventional strain gages. Other objects include providing such a device which is essentially unaffected by normal variations in temperature and all parts of which are exceptionally long lived.

The invention features a transducer including a phototransistor arranged to receive light emitted from a light emitting diode and a movable shield between the transistor and diode. The shield is moved relative to the transistor and diode, within a predetermined range, and there is a linear relationship between the displacement of the shield and changes in the output of the phototransistor. The shield is connected to a member whose displacement is to be measured, and displacement of the member is measured simply by measuring the voltage output of the phototransistor.

Other objects, features and advantages will appear from the following detailed description of a preferred embodiment taken in conjunction with the attached drawings in which.

Figure 1:
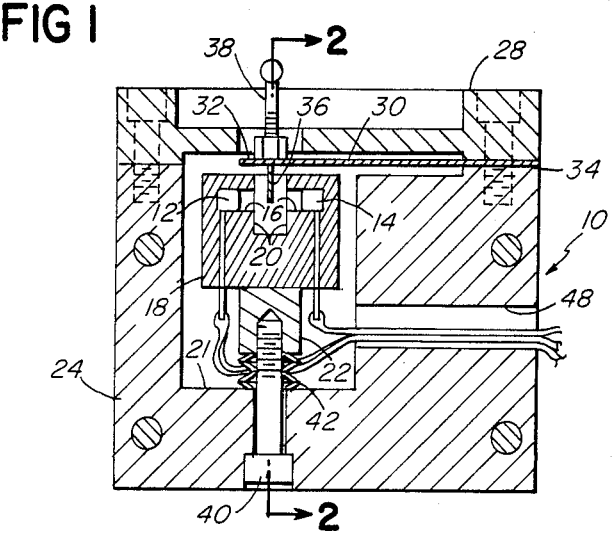
FIG. 1 is a sectional view of a transducer, the section being taken at line 1—1 of FIG. 2.
Figure 2:
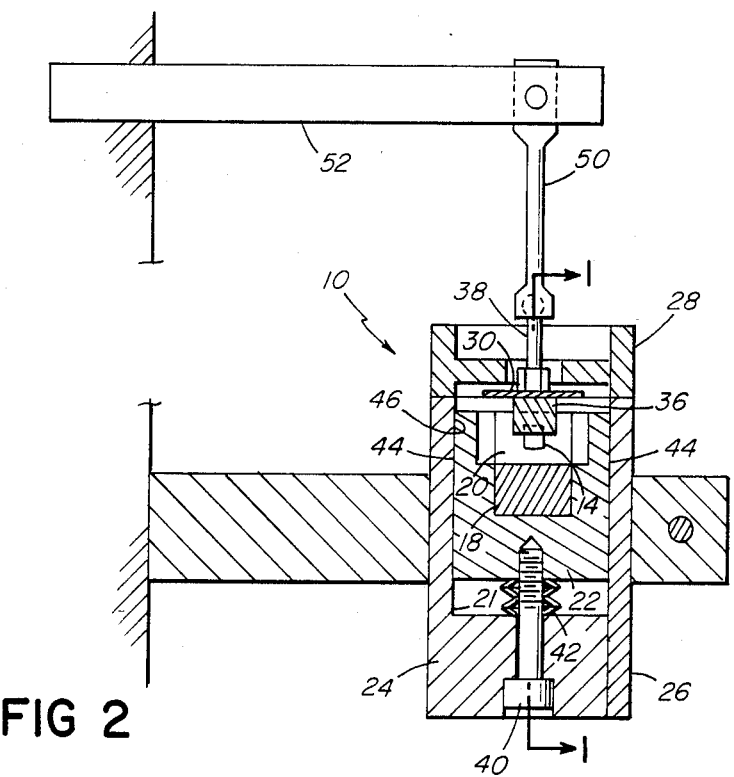
FIG. 2 is a sectional view taken at line 2—2 of FIG. 1 illustrating the transducer attached to measure deflection of a beam.
Figure 3:
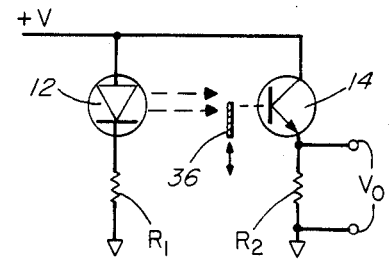
FIG. 3 is an electrical schematic.

Referring now to FIGS. 1 and 2, transducer 10 includes a source and sensor assembly (Texas Instruments No. TIL 148) comprising a light emitting diode 12 and a phototransistor 14 mounted in aligned recesses 16 of a support 18 on opposite sides of a transverse rectangular slot 20. The entire assembly is fitted in a U-shaped bracket 22 adjustably supported within a rectangular cavity 21 defined by a bolted together main body 24 and side cover plate 26. A top cover 28 is bolted on top of body 24, closing the top of cavity 21.

As shown most clearly in FIG. 1, the underside of cover 28 is relieved, as is a portion of the top of body 24 at one end of cavity 21, to provide an elongated recess for a metal strip 30 (typically, a strip of aluminum about 1/16 in. thick and ⅜ in. wide) cantilever mounted with one end 34 clamped between body 24 and cover 28, and its free end 32 vertically displaceable within cavity 21. A rectangular shield 36 on free end 32 of strip 30 extends down into slot 20 of support 18, between light emitting diode 12 and phototransistor 14. A drive rod 38 extends vertically upward from the free end 32 of strip 30, through a hole in top cover 28.

The vertical position of bracket 22, and hence the mounting of the transducer assembly within cavity 21, is adjusted by a bolt 40 extending upwardly through the bottom of body 24 and threaded into the base of bracket 22. Belleville washers 42 surround bolt 40, engaging the floor of cavity 21 and the bottom of bracket 22 and urging bracket 22 vertically upward as far as bolt 40 will permit. The flat outer sides 44 of bracket 18 are in sliding contact with the inner walls 46 of cavity 21, and thus prevent twisting or rotation of bracket within the cavity. The electrical leads of phototransistor 14 and light emitting diode 12 are led from cavity 21 through a side bore 48.

FIG. 2 shows transducer 10 clamped in place with drive rod 38 connected, by connecting rod 50, to measure the deflection (displacement) of a cantilever beam 52.

Figure 4:
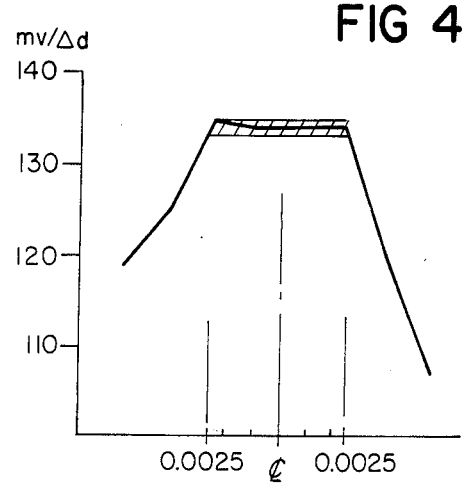
FIG. 4 is a graphical representation of operating characteristics of the transducer.

In operation, the electrical leads of phototransistor 14 and light emitting diode 12 are connected, as shown in FIG. 4, and a constant output voltage V; (typically about 12 volts) is applied. Infrared light is emitted from photodiode 12 and the output of phototransistor 14 measured by measuring the output voltage $V_o$ across an output resistor $R_2$ (1000 ohms) connected between phototransistor 14 and ground. A current-limiting resister $R_1$ (500 ohms) is connected between light emitting diode 12 and ground. As shield 36 is moved up and down between light emitting diode and phototransistor, the area of phototransistor 14 on which light is incident, and thus the measured output $V_o$ of phototransistor 14, changes.

It has been found that, in a photodiode-phototransistor assembly, there is a region within the overall light receptive area of the phototransistor the characteristics of which are such that the output of the phototransistor will vary linearly with displacement of shield 36. Thus, if shield 36 initially is positioned to permit light from diode 12 to fall on but a part of this region of phototransistor 14, and the shield is then displaced from its initial position so that light from the diode is incident on more (or less) of the region, the changes in output of phototransistor per unit displacement of shield 36 (i.e., millivolts change in output per 0.001 in. of displacement of shield 36) will be essentially constant. The exact location and extent of the linear region will vary somewhat depending on the particular transducer assembly employed, as will the variations in output.

In the source and sensor assembly of the abovedescribed embodiment, light emitting diode 12 has a circular aperture about 0.050 in. in diameter, and phototransistor 14 is located in a slot 0.025 in. wide and 0.060 in. high. The linear region is close to the horizontal center line of the two components (i.e., midway their height); and shield 36 is thus initially positioned relative to the light emitting diode and phototransistor (using bolt 40 to move support bracket 22 relative to shield 36) so that, when the metal strip 30 supporting shield 36 is in its rest or unstressed condition, the lower edge of the shield is aligned with the phototransistor horizontal center line. Light from only the lower half of light emitting diode 12 will thus be incident on only the lower half of phototransistor 14. As beam 52 is flexed up (or down), shield 36 is displaced upwardly (or downwardly, as the case may be), more (or less) light from light emitting diode 12 is incident on more (or less) of the phototransistor 14, and the output $V_o$ of the phototransistor increases (or decreases).

FIG. 4 illustrates the changes in output with displacement of the above-described embodiment. As shown, the output of phototransistor 14 changes approximately 134 millivolts per 0.001 in. of displacement of shield 36 throughout a displacement range extending approximately 0.0025 in. on either side of the center line of the phototransistor. Outside this total 0.005 in. wide range, displacement of the shield will continue to cause increases or decreases in output $V_o$, but the changes in output per unit displacement are not linear.

If desired to measure displacement in only a single direction, for example, downward movement of beam 52, phototransistor 14 and light emitting diode 12 may be positioned relative to shield 36 so that, at rest, the bottom edge of the shield will be aligned with the top of, and thus will permit light from the light emitting diode to fall upon, the 0.005 in. high linear range area of the phototransistor.

OTHER EMBODIMENTS

Other embodiments of the invention will be within the scope of the following claims.

For example, any of a large number of source and sensor assemblies other than Texas Instruments TIL No. 148 may be used. Typical other assemblies usable include Texas Instruments Model TIL 147, General Electric Models H13A1, H13A2, and H17A1, and Optron Model OPB804.

The exact physical area over which the output of the transducer of each of these assemblies will be linear with shield displacement will vary somewhat from that of the already disclosed embodiment, but can easily be determined.

As used in the appended claims, the term "central region" means a region close to a line extending through the center of the light responsive area of the phototransistor.

What is claimed is:

1. The method of measuring displacement of a member comprising:
   providing a light-emitting diode and phototransistor so arranged that light emitted from said light-emitting diode is incident on said phototransistor and causes an output from said phototransistor, said phototransistor having a central region in which said output of said phototransistor is linearly related to the fraction of relatively narrow central region on which said light emitted from said diode is incident, said central region constituting a relatively narrow portion of the total range of operation of said phototransistor;
   providing a movable shield intermediate said light-emitting diode and phototransistor in position for blocking a portion of said light emitted from said light-emitting diode and preventing said emitted light from being incident on a portion of said phototransistor;
   connecting said shield to said member so that displacement of said member will move said shield and thus vary the amount of said emitted light blocked by said shield and the portion of said phototransistor on which said emitted light is incident, thereby changing said output from said phototransistor;
   adjusting said shield relative to said light-emitting diode and phototransistor such that in an initial relative position thereof the portion of said phototransistor on which light emitted from said diode is incident includes some but not all of said relatively narrow central region of said phototransistor,
   said shield thus being positioned relative to said light-emitting diode and said phototransistor such that movement of said shield in response to said displacement of said member will vary the fraction of said central region on which said emitted light is incident; and,
   measuring said changes in said output of said phototransistor in response to movement of said member over the limited range in which such movement moves said shield so as to vary the fraction of said central region on which said light emitted from said diode is incident and in which changes in said output of said phototransistor per unit movement of said shield are substantially constant, thereby to determine the amount of displacement of said member.

2. The method of claim 1 wherein the position of said shield relative to said light-emitting diode and phototransistor is adjusted prior to connecting said shield to said member.

3. The method of claim 1 wherein said shield is adjusted relative to said diode and said phototransistor such that light from said diode is incident on a portion of said phototransistor lying on one side of the center line thereof and substantially no light from said diode is incident on the portion of said phototransistor lying on the other side of the center line thereof.

4. The method of claim 1 further comprising providing a main body for supporting said light-emitting diode said phototransistor and said shield, said main body having a first mount for supporting light-emitting diode and said phototransistor in a fixed position relative to each other and a second mount for supporting said shield for movement relative to said light-emitting diode and said phototransistor.

5. The method of claim 4 wherein said first mount is adjustably mounted on said body.

6. The method of claim 5 wherein said main body defines a cavity in which said first mount is positioned, and wherein the sides of said first mount slidably engage walls of said cavity.

7. The method of claim 4 wherein said second mount comprises a thin strip of metal cantilever mounted at one end portion thereof to said main body and having said shield connected to the opposite end position thereof.

8. The method of claim 1 wherein said central region is not more than about 5 mils wide.

9. The method of claim 1 wherein said central region is about 5 mils wide.

* * * * *